A. L. POWELL.
TRANSMISSION FOR ENGINES.
APPLICATION FILED DEC. 8, 1920.
1,384,337.
Patented July 12, 1921.
2 SHEETS—SHEET 1.
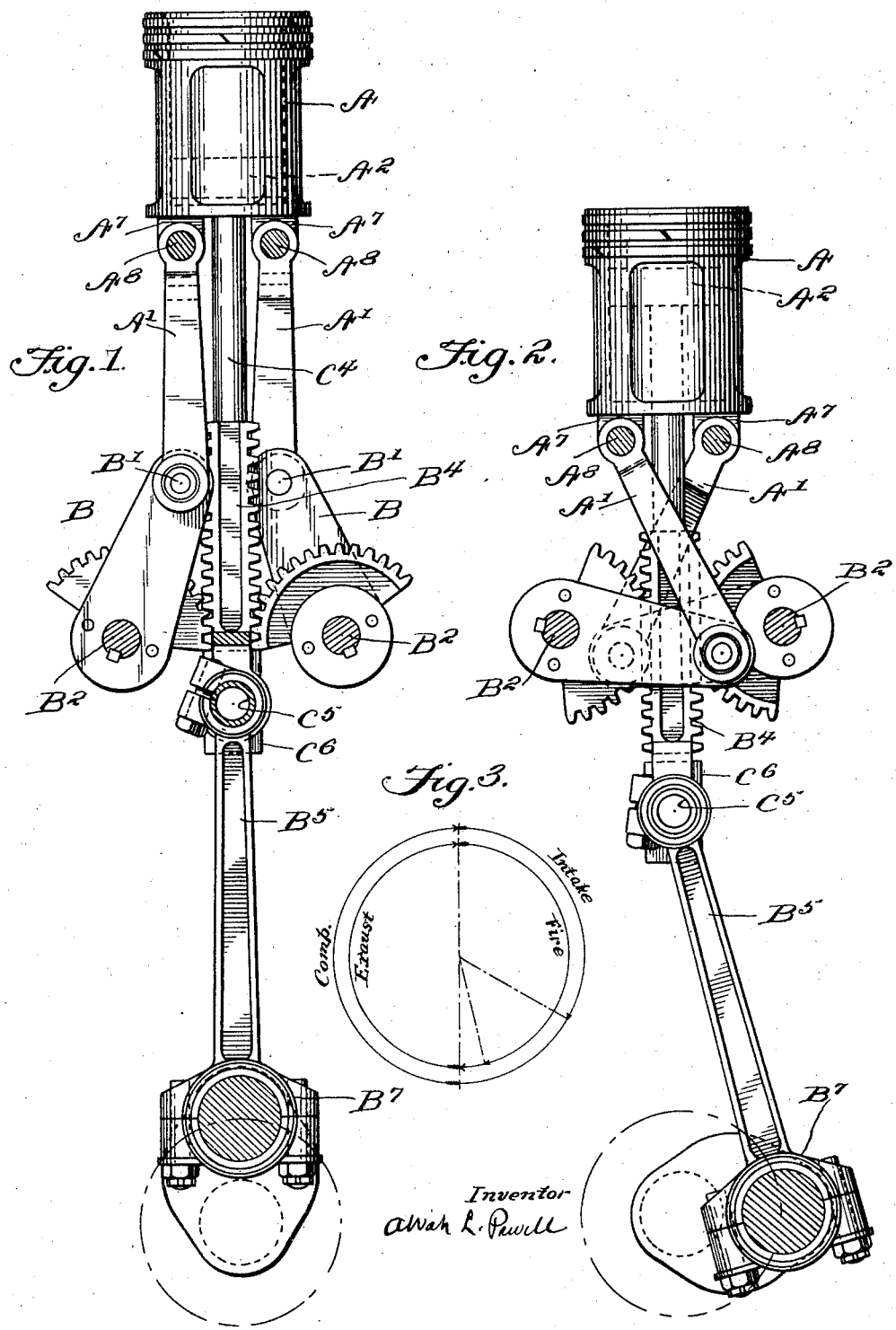

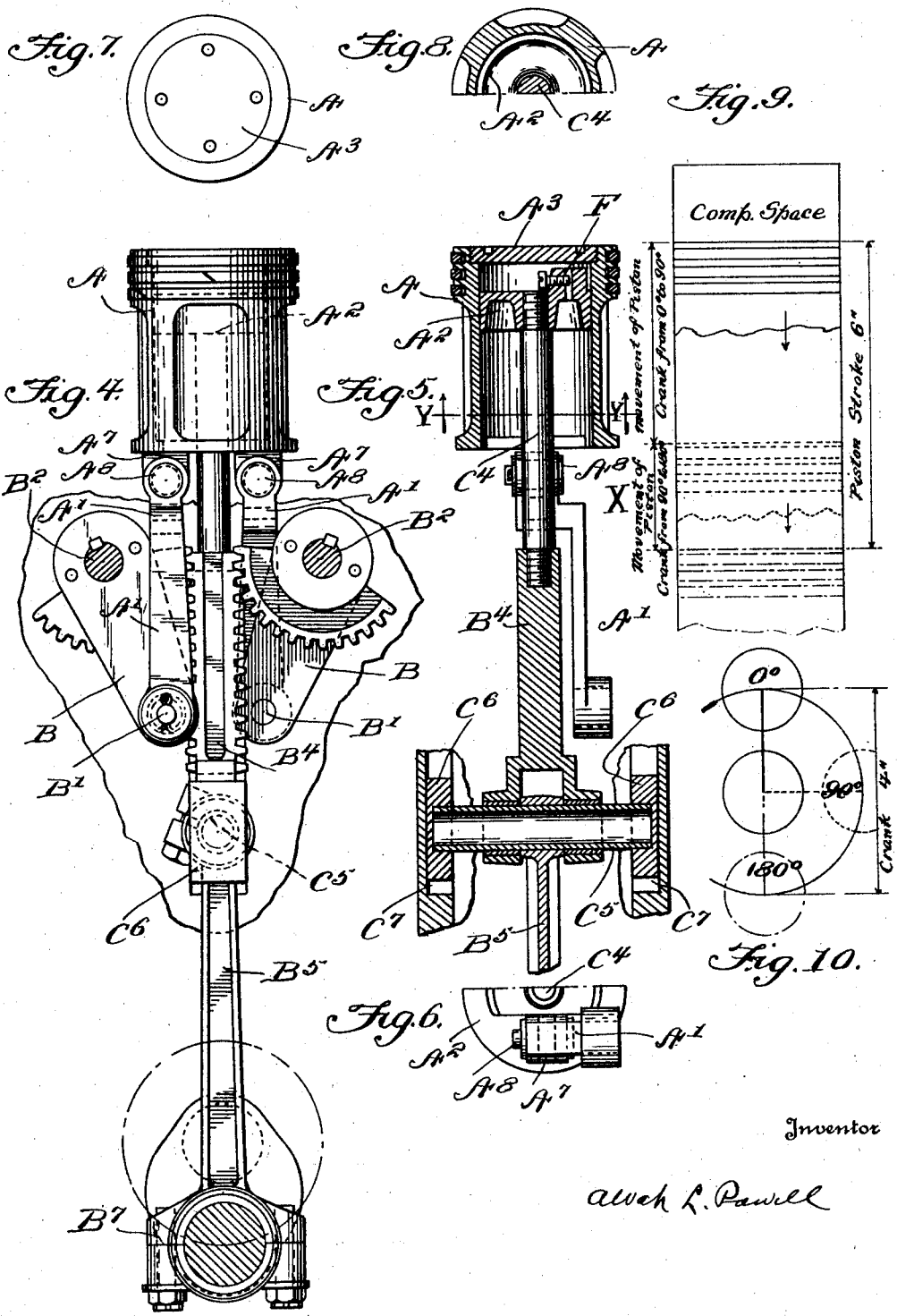

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,337.      Specification of Letters Patent.      Patented July 12, 1921.

Application filed December 8, 1920. Serial No. 429,171.

*To all whom it may concern:*

Be it known that I, ALVAH L. POWELL, citizen of the United States, residing at Miles City, in the county of Custer and State of Montana, have invented certain new and useful Improvements in Transmission for Engines, of which the following is a specification.

My invention relates to improvements in the transmitting member of engines by which I secure a variation in the movement of the piston with reference to that of the crank, enabling me to gain advantages in the operation of such engines that are not possible with the construction at present used. This application covers improvements over the forms shown in a series of applications filed with this, bearing Serial Numbers 429,173, 429,172, 429,168, but while the general principles are the same, the construction embraces novel forms that have advantages peculiar to them. In the annexed drawings, I show an application of my invention, in which Figures 1 and 2 are vertical elevations.

Fig. 3 is a diagram of the power cycle.

Fig. 4 shows the parts in elevation, when at bottom stroke.

Fig. 5 is a partial vertical section, showing the double pistons and connecting members.

Fig. 6 is a partial plan showing connections of piston link to main piston.

Fig. 7 is a plan of the top of main piston.

Fig. 8 is a half section, on dotted line Y—Y, Fig. 5.

Fig. 9 is a diagram of cylinder action.

Fig. 10 is a crank diagram, to accompany Fig. 9.

In the constructions shown in my prior applications I have described the lever cranks and racks as shown in the present application, but hitherto I have confined these racks to a movement varying in angularity. In the accompanying drawings the rack moves in a vertical plane, in a straight line, the motion being transmitted to the engine crank by means of a pitman rod, $B^5$. It is desirable to provide some means to automatically care for any tooth wear in racks and pinions, and this I effect by using a small piston within the larger, or power, piston. The former gives a cushioning action that insures correct tooth engagement. In describing the various parts by which I accomplish this I shall confine myself to those elements distinct from others given in previous applications, referring to those already covered in general terms.

In Fig. 1 the piston A is bored to accommodate a second piston, or plunger, $A^2$ (dotted lines, Figs. 1, 2 and 4. Solid lines in Fig. 5). In the upper end of piston A is screwed a cap, $A^3$, thus leaving a chamber in which the piston $A^2$ is free to move. At the opposite, or lower, end of piston A there are lugs, $A^7$, shown in the various views. Passing through these lugs are pins, $A^8$, from which are suspended links, $A^1$, that connect, by means of the pins $B^1$, Fig. 1, with the crank levers, B, B. The lever cranks B are pivoted at $B^2$, $B^2$, being supported at any convenient point in the engine frame. From the secondary piston, $A^2$, a vertically disposed bar, $C^4$, is connected to a rack. The bar $C^4$ is preferably threaded into the end of rack, as shown in Fig. 5. The bar $C^4$ is thus a connecting member between the secondary piston and rack. At the lower end of the said rack is a fork, made integral with it. This forked end is bored to fit a crosshead pin $C^5$, that is attached to crosshead blocks, $C^6$, the latter sliding in crosshead guides, forming part of engine frame, as shown at $C^7$. On the crosshead pin $C^5$, and between the forks of the rack, is suspended a pitman, $B^5$, that is suitably attached to the engine crank at $B^7$. It is evident, from an inspection of the drawings, that on the downward movement of the piston A, the links $A^1$, $A^1$, will transmit the movement to the segmental pinions, the movement being thereby transferred to the rack. The motion of the rack is, in turn, imparted to the pitman. This transfers the cylinder effect directly to the engine crank, causing the shaft to rotate. The movement of the rack is vertical, by reason of its connection with the piston $A^2$ and the crosshead pin, $C^5$. As hereinbefore stated, the movement of the racks will lead to wear and, in a practical engine, this would insure noise while running that would be objectionable. To obviate this, besides insuring proper tooth contact at all times, and under all conditions, I cause a hole to be drilled through the secondary piston, A², as shown at F, Fig. 5. The piston A² is so placed in the piston A that there is always a certain space between them, Fig. 5. On the downstroke of piston A, piston A² tends to lag, owing to the compression given to the air contained between it and piston A. This air is forced out through a hole at F, an adjustment means by which the rate of outflow and intake may be controlled being shown in Fig. 5. The effect of the compression of the air, however, is to hold the teeth of the rack in firm engagement with those of the pinions, by reason of the lag established in the movement of the secondary piston by the conditions described.

On upstroke the pressure of the crosshead C⁶ will force the rack B⁴ upward, causing the segmental pinions to make a partial rotation. The primary piston will be moved by the links A¹, A¹, the secondary by the piston rod C⁴. As the movement of the rack will be governed by the movement of the crank, B⁷, and the movement of the connecting links A¹, A¹, by that of the crank levers B, B, the movements of the pistons will vary to each other as the radii of pins B¹, B¹, and pitch radii of the segmental pinions. Piston A will therefore move faster than piston A².

On upstroke, A is on compression or clearance, in either case a partial compression pressing back on it from engine cylinder, augmented by a partial vacuum between pistons, due to intake of air by piston A² during upstroke. This pressure will react through links A¹, A¹, on segmental pinions, tending to hold the teeth of the segmental pinions in engagement with the rack. The rack B⁴, on upstroke, will be in thrust against piston A², driven by the momentum of engine shaft and parts. The rack will therefore advance freely against the secondary piston which will be drawing in air through hole F, the diameter of the latter governing the rate of inflow and degree of pressure. The rack will be in positive relation to the segmental pinions and piston A, but in a variable relation to piston A². The positive pressure of A will insure proper tooth contact, under these conditions, for the back pressure of A will react through the means described, and maintain uniform pressure on the segmental pinions and, through them, a similar pressure on rack teeth.

The secondary piston acts as a support and guide for the rack B⁴, while the use of the links A¹, A¹, obviates any slide slap in piston A.

The movement of the links A¹ with reference to lever cranks requires no compensating element, for they aline themselves properly in any position of the cranks, as they are substantially pitman rods.

In Figs. 3 and 9, I show a diagram by which the relation of the piston to crank is shown, through one cycle. In an engine having the transmitting gear shown and described herein there is always a difference between piston stroke and engine crank stroke. Let it be assumed that the piston stroke is six inches and the crank stroke four inches. While the piston is moving six inches the crank on crank shaft will pass through one hundred and eighty degrees of its movement. During ninety degrees of this distance it is shown in the main diagram that the expansion pressure will act on the more favorable portion of the crank diameter during the period when the cylinder pressure is near, or at, maximum. On the other hand, the movement from ninety degrees to a hundred and eighty degrees, when cylinder pressure is falling at accelerating speed, is through a relatively short distance, by reason of the positions through which the crank is passing. This is indicated at X, Fig. 9.

Variations from the arrangement given in this application may be made without departing from the essential principles of my invention.

What I believe is new, and ask to have protected by Letters Patent, is—

1. In a transmission for engines, a power means, a primary piston, a secondary piston operating in said primary piston, differential operative means by which the movement of the primary piston is made greater than that of the secondary piston, tooth members operated by said operative means, and means for compensating for variations in contact between said tooth members, substantially as described.

2. In a transmission for engines, the combination of variably moving pistons, one slidable in the other, cranks, connecting links from one piston to said cranks, pins supporting said cranks, segmental pinions on said pins rotatable with said cranks, a rack, a rod from a second piston connecting with said rack the teeth of which engage the teeth of the said segmental pinions, a crosshead connected with said rack, crosshead guides, a crank, a connecting rod from the crosshead to said crank, power means for operating said primary piston, and an opening in the secondary piston to govern compression and vacuum between said pistons, substantially as described.

3. In an engine, a transmission means formed of meshing toothed members, a primary operating piston, a secondary compression and suction piston slidable in said primary piston, means for connecting said pistons to said toothed members, and means for varying the movement of said pistons with reference to movement of said toothed members whereby variation in contact between the teeth of the engaging members is compensated for, substantially as described.

4. In an engine, the combination of a power means, a transmission means, means mediate to and in relation with the said power means for differentiating the stroke of said transmission means in relation to the stroke of said power means, and means for varying the movement of the power and transmission means to compensate for variations in wear of the connecting transmission member, substantially as described.

In testimony whereof I affix my signature.

ALVAH L. POWELL.